United States Patent
Amosov et al.

(10) Patent No.: US 9,346,699 B2
(45) Date of Patent: May 24, 2016

(54) METHOD OF MAKING A GLASS LAMINATE HAVING CONTROLLED STRENGTH

(71) Applicant: Corning Incorporated, Corning, NY (US)

(72) Inventors: Alexey Sergeyevich Amosov, Gatchina (RU); Steven Roy Burdette, Big Flats, NY (US); Shriram Palanthandalam Madapusi, Corning, NY (US); Ilia Andreyevich Nikulin, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/596,470

(22) Filed: Jan. 14, 2015

(65) Prior Publication Data

US 2015/0210583 A1 Jul. 30, 2015

Related U.S. Application Data

(60) Provisional application No. 61/933,092, filed on Jan. 29, 2014.

(51) Int. Cl.
| | |
|---|---|
| *C03B 17/00* | (2006.01) |
| *C03B 17/06* | (2006.01) |
| *C03C 1/00* | (2006.01) |
| *C03B 17/02* | (2006.01) |

(52) U.S. Cl.
CPC .............. *C03B 17/064* (2013.01); *C03B 17/02* (2013.01); *C03C 1/00* (2013.01)

(58) Field of Classification Search
USPC .......................................... 65/29.19, 90, 121
IPC ............................................. C03B 17/06,17/00
See application file for complete search history.

(56) References Cited

U.S. PATENT DOCUMENTS

| | | | |
|---|---|---|---|
| 4,214,886 A | 7/1980 | Shay et al. | |
| 7,748,236 B2 | 7/2010 | Pitbladdo | |
| 8,007,913 B2 * | 8/2011 | Coppola | B32B 17/06 428/426 |
| 8,429,936 B2 * | 4/2013 | Allan | C03B 17/064 65/90 |
| 9,090,505 B2 * | 7/2015 | Godard | C03C 23/0065 |
| 2013/0015180 A1 * | 1/2013 | Godard | C03C 23/0065 219/759 |

OTHER PUBLICATIONS

G. W. Scherer, "Relaxation in Glass and Composites", Krieger Publishing Company, 1992—Book.
R. L. Taylor, K. S. Pister, and G. L. Goudreas. "Thermochemical Analysis of Viscoelastic Solids". International Journal for Numerical Methods in Engineering. vol. 2. 45-59. 1970.
J.C. Simo. "On fully three-dimensional finite strain viscoelastic damage model: Formulation and computational aspects". Comput. Meth. in Appl. Mech. Eng.. vol. 60. 153-173. 1987.
A. Fluegel et al., "Density and thermal expansion calculation of silicate glass melts from 1000° C to 1400° C", Phys. Chem. Glasses: Eur., Glass Sci. Technol. B, 49(5), 245-257, Oct. 2008.
O.S.Narayanaswamy, "A model of structural relaxation in glass", Fall Meeting of the Glass Division of the American Ceramic Society, Bedford, PA, Paper No. 6-G-70F, Oct. 15, 1970.

* cited by examiner

*Primary Examiner* — Mark Halpern
(74) *Attorney, Agent, or Firm* — John L. Haack

(57) ABSTRACT

A method for making a glass laminate sheet including:
selecting a core glass composition and a clad glass composition combination for a glass laminate structure;
determining and comparing the viscosity and coefficient of thermal expansion (CTE) profiles for each of the selected core and the clad glass compositions with each other over a temperature range of interest including the onset of viscoelasticity to ambient temperature; and
processing the selected core and clad glass composition in a laminate fusion draw apparatus to form a laminate glass sheet in accordance with at least one difference condition for the clad effective coefficient thermal expansion ($CTE_{eff\ core}$) and the core effective coefficient thermal expansion ($CTE_{eff\ core}$). Another method for making a glass laminate sheet includes controlling the cooling rate to control the resulting strength of the laminate.

15 Claims, 9 Drawing Sheets

METHOD OF MAKING A GLASS LAMINATE HAVING CONTROLLED STRENGTH

CROSS-REFERENCE TO RELATED APPLICATIONS

This application claims the benefit of priority under 35 U.S.C. §119 of U.S. Provisional Application Ser. No. 61/933,092 filed on Jan. 29, 2014 and is related to, but does not claim priority to, commonly owned and assigned copending patent applications:

U.S. Ser. No. 61/103,126, filed Oct. 6, 2008, entitled "ALUMINOBOROSILICATE GLASSES";

U.S. Ser. No. 61/228,290, filed Jul. 29, 2009, entitled "SODIUM RICH FUSION FORMABLE GLASS";

U.S. Ser. No. 61/263,930, filed Nov. 29, 2009, entitled "FUSION FORMABLE LOW MELTING TEMPERATURE SODIUM CONTAINING GLASS";

U.S. Ser. No. 61/604,833, filed Feb. 29, 2012, entitled "Low CTE, Ion-Exchangeable Glass Compositions and Glass Articles Comprising the Same";

U.S. Ser. No. 61/604,839, filed Feb. 29, 2012, entitled "Low CTE Alkali-Free Boroaluminosilicate Glass Compositions and Glass Articles Comprising the Same," mentions glass cladding layers that can be formed from a glass composition;

U.S. Ser. No. 61/866,272, filed Aug. 15, 2013, entitled "Alkali-Free Boroaluminosilicate Glasses with High Native Scratch Resistance";

U.S. Ser. No. 61/821,426, filed May 9, 2013, entitled "Alkali-Free Phosphoboroaluminosilicate Glass;"

U.S. Ser. No. 61/866,168, filed Jul. 15, 2013, and U.S. Ser. No. 61/878,829, filed Sep. 17, 2013, entitled "Intermediate to High CTE Glasses and Glass Articles Comprising the Same," which applications mention moderate to high CTE core glasses, and laminates thereof, specifically core glasses that have intermediate to high CTE values and when processed with a low CTE clad glass, the CTE mismatch creates clad compression, enhancing strength; and U.S. Pat. No. 8,429,936, mentions glass having viscous, visco-elastic, and elastic zones in a fusion draw apparatus, the content of which documents are relied upon and incorporated herein by reference in their entirety.

The entire disclosure of any publication or patent document mentioned herein is incorporated by reference.

BACKGROUND

The disclosure relates to a method for controlling the final strength of a laminated glass sheet formed in a laminate fusion draw apparatus.

SUMMARY

In embodiments, the present disclosure provides a method for controlling the final strength properties of a laminated glass sheet formed in a laminate fusion draw apparatus by managing the viscoelastic glass properties of the constituent glasses.

In embodiments, the present disclosure provides a double fusion process for making a strengthened three layer or greater layered laminated sheet by creating or generating a difference in the coefficient of thermal expansion (CTE) between the two different glasses of the core ($CTE_{core}$) and the clad ($CTE_{clad}$).

The disclosure demonstrates how the temperature dependent strength of a laminated sheet formed in the double fusion process can be affected by manipulating the viscoelastic behavior of the constituent glasses.

BRIEF DESCRIPTION OF DRAWINGS

In embodiments of the disclosure.

DETAILED TECHNICAL DESCRIPTION

Figure 1:
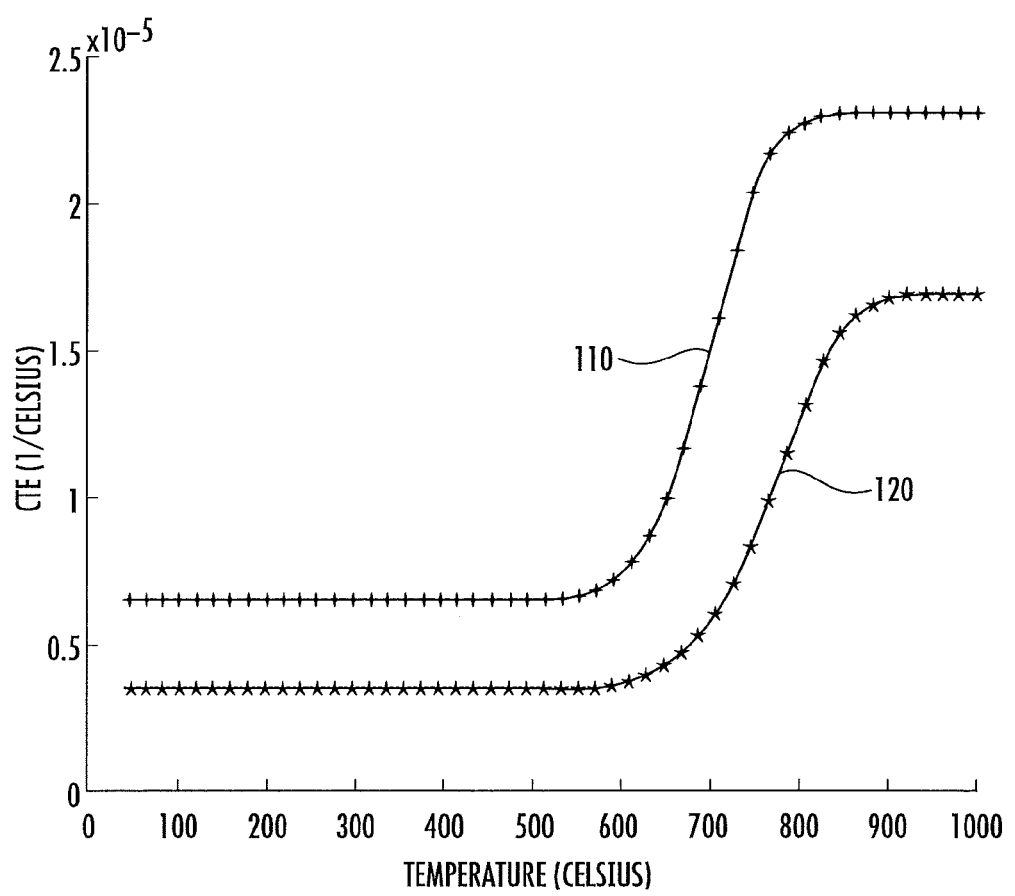
FIG. 1 shows the stress evolution of a glass pair in a glass laminate sheet through a typical fusion draw process cooling rate for the CTE v. temperature of a selected laminate core glass (110) and the laminate clad glass (120).

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

In embodiments, the disclosed method of making laminate glass products provides one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

Definitions

"Effective CTE" ($CTE_{eff}$) of a glass is the rate of change of the thermal strain of the glass with a change in temperature. The thermal strain of a viscoelastic material such as glass is always changing in the glass transition zone, hence the effective CTE gives an estimation of instantaneous CTE when thermal strain is changing with a change in temperature. The concept of effective CTE is useful where there is a monotonic decrease in temperature, which is typically the situation in a fusion draw process.

In embodiments, the disclosure provides a method for making a glass laminate sheet comprising:
  selecting a first core glass composition and a second clad glass composition combination for a glass laminate structure;
  determining and comparing the viscosity and coefficient of thermal expansion (CTE) profiles for each of the first core and the second clad glass compositions with each other over a temperature range of interest including from the onset of viscoelasticity to ambient temperature; and
  processing the selected first core glass composition and the second clad glass composition in a laminate fusion draw apparatus to form a laminate glass sheet in accordance with at least one difference condition for the clad effective coefficient thermal expansion ($CTE_{eff\,core}$) and the core effective coefficient thermal expansion ($CTE_{eff\,core}$).

In embodiments, the "determining" step of the viscosity and the CTE can be accomplished by, for example, an actual experimental measurement of a known or new glass composition, selecting viscosity and the CTE values for a known glass composition from the literature, or by calculation using available methods or models such as disclosed herein.

In embodiments, the at least one difference condition for the clad $CTE_{eff}$ and the core $CTE_{eff}$ comprises or can be, for example, at least one of: maximum strengthening, strength degradation, or temperature independent strengthening.

In embodiments, the maximum strengthening difference condition comprises or can be, for example, having the core $CTE_{eff}$ always greater than clad $CTE_{eff}$;

In embodiments, the strength degradation difference condition comprises or can be, for example, having:
  i) the clad $CTE_{eff}$ initially less than the core $CTE_{eff}$;
  ii) in the crossover or transition region, the clad $CTE_{eff}$ is greater than the core $CTE_{eff}$; or
  iii) below the glass transition region, the clad $CTE_{eff}$ is less than to the core $CTE_{eff}$.

In embodiments, the temperature independent strengthening difference condition can be, for example, having the clad $CTE_{eff}$ being comparable to the core $CTE_{eff}$ over a temperature range of 200 to 580° C.

In embodiments, the determining comprises or can be, for example, calculating an area (A) metric of the formula:

$$A = \int_{298}^{T_0} \frac{d\varepsilon^{thdiff}}{dT} dT = \int_{298}^{T_0} \alpha_{eff}^{thdiff} dT$$

for the selected combination of the clad composition and the core glass composition to determine the difference condition, where
  $\varepsilon^{thdiff}$ is the thermal strain difference between the two glasses;
  $\alpha_{eff}^{thdiff}$ is the difference in $CTE_{eff}$ of the two glasses; and
  T is the temperature from the onset of viscoelasticity ($T_0$) to ambient, e.g., 25° C.; 298° K.

In embodiments, the method can further comprise or optionally include a step of determining the compressive stress of the clad layer in the resulting glass laminate sheet.

In embodiments, the resulting glass laminate sheet can be, for example, a two layer (clad:core) laminate structure, a three layer (clad:core:clad) laminate structure, or multilayer (e.g., clad:clad:core:clad:clad) laminate structure.

In embodiments, the present disclosure is advantaged by providing a method of making a glass composition, which method produces a strengthened laminated glass sheet as desired. By controlling the properties of the laminated glasses through the glass transition zone in a double fusion draw apparatus, the final stress in the product can be amplified or degraded as desired. The control of glass properties in the $T_g$ zone provides desired strength control in the resulting laminated glass product sheet.

In embodiments, an application of the disclosed method can provide a strengthened laminated sheet which unexpectedly loses only a small portion of it's product strength, for example, from about 2 to about 20 relative %, such as about 8%, when reheated, for example, from an ambient temperature of, for example, about 20° C. (293.15 K) to 475° C. (748.15 K) at a rate of, for example, 3° C./s. In contrast, the glass laminate sheets formed by double fusion in the prior art are known to gradually lose their strength when reheated. For example, the laminate product of the present disclosure in Examples 2 and 3, respectively, lose 53% and 79% of their product strength when reheated to 475° C. (748.15 K) at a rate of 3° C./s.

In embodiments, the disclosure provides a method to make a glass laminate sheet that exhibits no strengthening at temperatures above, for example, 600° C. (873.15 K), and gradually increases glass strength at lower temperatures such as from below 20° C. (293.15 K) to 600° C. (873.15 K).

In embodiments, cutting the newly formed laminated glass sheet product of the disclosure can be readily accomplished at the given elevated temperature, for example, while in or near the viscoelastic zone, with considerable ease (e.g., less energy), and with a relative reduction in laminate strength, compared to cutting at ambient temperature.

Strengthening of glass laminates in the double fusion forming process historically could be accomplished by ensuring a certain difference in the CTE of constituent glasses from a low temperature (e.g., 25° C. (298.15 K)) to above the glass transition temperature ($T_g$). U.S. Pat. No. 4,214,886 (the '866 patent) mentions a double fusion glass process to obtain a strengthened laminate glass sheet, but does not mention controlling glass properties through the glass transition to manage the strength in the final laminate glass product. For example, strengthening of laminated sheets in a double fusion forming process of the '866 patent was achieved by maintaining a constant difference in the thermal expansion property of the core and clad glasses without an awareness of the changing coefficient of thermal expansion through the glass transition zone in the final formed sheet. While laminate glass strengthening was generally recognized in the '866 patent, the multitude of strengthening effects that can be achieved by manipulating the glass properties at temperatures near and above the glass transition temperature has apparently not been explored or exploited. At temperatures near and above the glass transition temperature ($T_g$), glasses exhibit viscoelastic properties.

Materials having viscoelastic, elastic, or both behaviors are known. A viscoelastic substance has an elastic component and a viscous component. The viscosity of a viscoelastic substance gives the substance a strain rate dependent on time.

Laminate stress in a final laminate glass product is comprised of elastic thermal strain difference and viscoelastic thermal strain difference. In accord with the present disclosure, maximum strengthening of a laminate glass product can be obtained in the viscoelastic region of a laminate fusion draw machine if the thermal strain difference of the glass component (i.e., clad or core) that freezes second (i.e., freezes last in time on cooling) is maximized, starting at the onset of viscoelastic behavior. Stated alternatively, an operator of a laminate fusion draw apparatus can maximize glass strengthening by maximizing the thermal strain difference of the glass having the higher $T_g$. This relationship can also be expressed as the area (A) under the thermal strain difference curve for a temperature range covering, for example, from room temperature (298° K) to the onset of viscoelasticity ($T_0$):

$$A = \int_{298}^{T_0} \frac{d\varepsilon^{thdiff}}{dT} dT = \int_{298}^{T_0} \alpha_{eff}^{thdiff} dT$$

where
$\varepsilon^{thdiff}$ is the thermal strain difference between the two glasses;
$\alpha_{eff}^{thdiff}$ is the difference in effective coefficient thermal expansion ($CTE_{eff}$) of the two glasses; and
T is the temperature.

The larger the positive value of the area (A) metric, the greater the strength of the final glass laminate product compared to a control. Conversely, in a laminate weakening example, the smaller the value of the area (A) metric, the lesser the strength of the final glass laminate product compared to a control.

Figure 7:
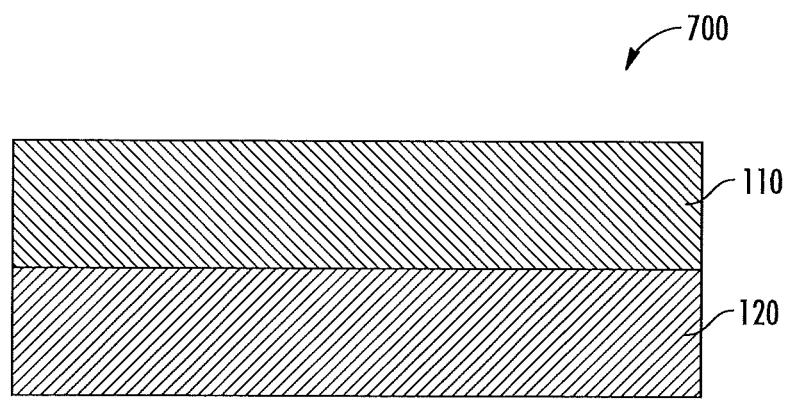
FIG. 7 shows an elastic laminate structure (700) having two different elastic layers; a core and a clad layer (110, 120), respectively.

Referring to the Figures, FIG. 7 shows a schematic of an elastic laminate structure (700) with two glass layers. Young's moduli of the layers are given by $E_1$ and $E_2$. Total strain, given by $e^{total}$, is measurable and the same in both glass layers. Thermal strain, given by $e^{th}$, may be different in each layer. Likewise, elastic strain, given by $e^{el}$, may differ between layers. Thickness of the two layers, $t_1$ and $t_2$, is in general different.

The stresses developed in the two layers (110, 120) as a result of elastic strains are given by the equations:

$$\sigma_1 = E_1 \varepsilon_1^{el} \text{ and } \sigma_2 = E_2 \varepsilon_2^{el}$$

where
$\sigma_1$ is the elastic strain of layer (110), $E_1$ is the Young's modulus of layer (110), and
$\varepsilon_1^{el}$ is the thermal strain of layer (110); and
$\sigma_2$ is the elastic strain of layer (120),
$E_2$ is the Young's modulus of layer (120), and
$\varepsilon_2^{el}$ is the thermal strain of layer (120).

The force balance equation in the laminate structure is given by the equation:

$$\sigma_1 t_1 + \sigma_2 t_2 = 0$$

where $t_1$ and $t_2$ are the respective thicknesses of the two layers.

Total measureable strain $\varepsilon^{total}$ for both the layers is the same since the structure is laminated.

$$\varepsilon^{total} = \varepsilon_1^{th} + \varepsilon_1^{el} = \varepsilon_2^{th} + \varepsilon_2^{el}$$

Figure 8:
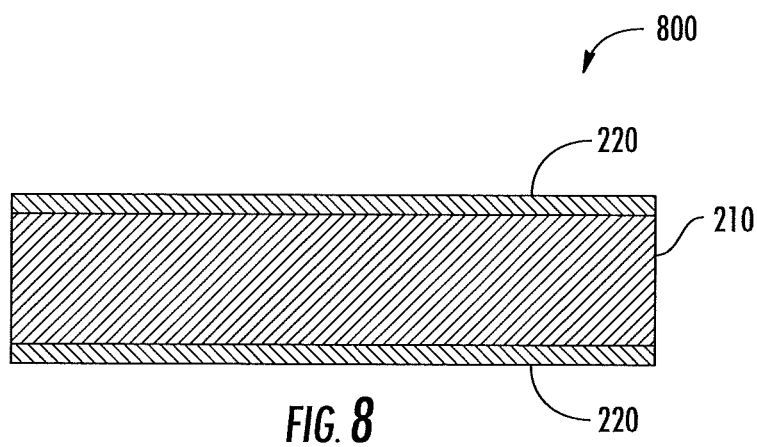
FIG. 8 shows a glass laminate structure (800) having three layers with two different glasses: a single glass core (210) and two glass clad (220) or outer layers.

Given the thermal strains in each layer, solving the above equations for stresses and elastic strains gives the complete stress-strain state in the laminate structure. The resulting stresses, when compressive in the clad layers of a glass laminate, as shown in FIG. 8, give a laminated glass structure its strengthened properties. This analysis can be extended to asymmetric structures having, for example, a different number of layers, different materials, different viscoelastic behaviors, or combinations thereof.

For a three layer glass laminate exhibiting viscoelastic behavior, the glass properties including coefficient of thermal expansion (CTE) can change continuously with temperature, and the changes being most pronounced in the glass transition zone. As a laminated structure is cooled from the liquid state the stress and the strain evolve continuously according to the varying properties and relaxation mechanics of the glass materials. Evolution of the stress and the strain on cooling is governed by the theory of viscoelasticity (see G. W. Scherer, "Relaxation in Glass and Composites," Krieger Publishing Company, 1992).

To demonstrate embodiments of the disclosed method, a laminate structure mimicking a glass element at the center of a double fusion forming process is considered.

A schematic of the three layered glass laminate sheet (800) is shown in FIG. 8. The material selected for core layer (210) can be, for example, Glass D in Table 2, which is a commercial grade from Corning, Inc. The thickness of core glass layer (210) can be, for example, 0.9 mm, and the thickness for each of the clad glass layers (220) can be, for example, 0.05 mm, for a total laminate thickness of 1.00 mm.

The structure shown in FIG. 8 can be subjected to cooling similar to the cooling experienced by glass at the centerline of a typical fusion draw machine. The viscoelastic stress and strain evolution can be computed by the integration scheme proposed by Taylor and subsequently modified by Simo (see R. L. Taylor, et al., "Thermochemical Analysis of Viscoelastic Solids", *International Journal for Numerical Methods in Engineering*, Vol. 2, 45-59, 1970; and C. Simo, "On Fully Three-Dimensional Finite Strain Viscoelastic Damage Model: Formulation and computational aspects," *Comput. Meth. In Appl. Mech. Eng.*, Vol. 60, 153-173. 1987). These computations have been separately verified by ANSYS (a commercial finite element software package). By changing the viscoelastic properties of the clad glass layer (220), significant strengthening can be achieved in the laminate glass sheet product as illustrated and demonstrated herein.

General Procedure for Laminate Glass Sheet Strengthening

Step 1. Select a first glass composition and a second glass composition for the core and clad components, respectively, of a three-ply or three-layer laminate structure of the structure, for example, clad:core:clad as illustrated in, for example, FIG. 8.

Step 2. Determine, that is ascertain by, for example, measuring or calculating the viscosity and coefficient of thermal expansion (CTE) for the first and second glass compositions, and then compare the viscosity and coefficient of thermal expansion (CTE) profiles for the first and second glass compositions with each other over a temperature range of interest including, for example, at least the onset of viscoelasticity to ambient temperature.

Step 3. Process the first and second glass compositions for the respective core and clad components in a laminate fusion draw apparatus to form a three-ply laminate glass sheet in accordance with at least one of the "difference conditions" for the clad $CTE_{eff}$ and the core $CTE_{eff}$ as listed in Table 1 and illustrated in Example 1 (maximum strengthening), Example 2 (strength degradation), or Example 3 (temperature independent strengthening). The area (A) metric can be calculated for each combination of clad and core glass compositions to determine which "difference condition" and which Example applies to the glass compositions selected.

In embodiments, one can accomplish an optional Step 4 to determine the compressive stress of the clad layer, that is, the strength or change in strength, of the laminate. The compressive stress of the clad layer can be calculated by, for example, TN modeling to compute the exact stress evolution and the final stress in the laminate product. TN modeling is described in, for example, O. S. Narayanaswamy, A Model of Structural Relaxation in Glass, *Journal of The American Ceramic Society*, Vol. 54, No. 10, 491-498 (1971).

EXAMPLES

The following Examples demonstrate how different laminate glass products having different strength properties can be obtained by manipulating in the viscoelastic region for different glass behavior in accordance with the above general procedure.

The following Examples also demonstrate an ability to control the resulting strength of a laminate glass sheet in a double fusion forming process by managing the viscoelastic properties of the constituent glasses, i.e., stress and structural relaxation properties with temperature. It is also possible to alter the strength properties of the laminate glass sheet by controlling the rate of cooling of the newly formed laminate glass sheet.

Example 1

Maximum Laminate Strengthening Procedure

In embodiments, the disclosure provides a method for making a maximum strengthened laminate glass sheet that can be accomplished as follows: selecting a clad and a core glass composition such that the effective CTE of the core glass is at all times greater than the effective CTE of the clad glass over a processing temperature range of, for example, at least the temperature of the onset of viscoelasticity ($T_0$) to ambient, such as 25° C. (298.15 K). The selection of glass compositions can precede or follow a determination and comparison of the viscosity and coefficient of thermal expansion (CTE) profiles for each of the selected core and the clad glass compositions with each other over a temperature range of interest including, for example, from the onset of viscoelasticity to ambient temperature.

The first glass composition is selected for the core component. The viscosity and coefficient of thermal expansion (CTE) are measured or calculated for the first glass composition over the temperature of the onset of viscoelasticity ($T_0$) to ambient, for example, 25° C. (298.15 K).

The second glass composition is selected for the clad component. The viscosity and coefficient of thermal expansion (CTE) are measured or calculated for the second glass composition over the temperature of the onset of viscoelasticity ($T_0$) to ambient, for example, 25° C. (298.15 K).

A signature plot or profile of the viscosity versus temperature, and a signature plot or profile of CTE versus temperature can be generated that compares the respective viscosity and CTE profiles of the first and the second glass compositions.

This combination of core and clad glass is processed through a laminate fusion draw apparatus to form the glass laminate sheet. FIG. 1 shows the stress evolution of the glass laminate sheet through a typical fusion draw process cooling rate for the CTE v. temperature of a selected laminate core glass (110) and the laminate clad glass (120).

Figure 2:
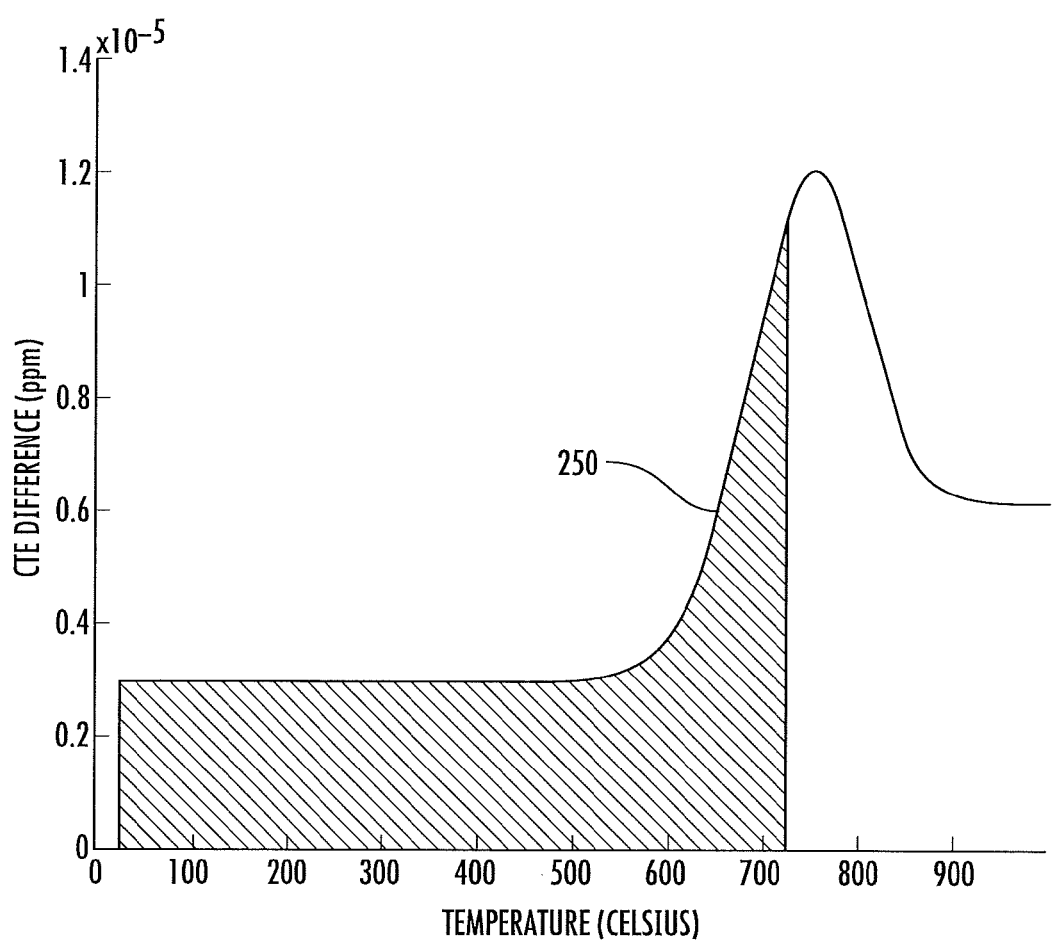
FIG. 2 shows the area (A) under the CTE difference curve where the shaded region (250) represents the continuous accumulation of stress and laminate strengthening for the glass pair of FIG. 1.

FIG. 2 shows the area (A) under the CTE difference curve defined above where the shaded region (250) represents the continuous accumulation of stress and laminate strengthening.

In one illustrative example listed in Table 1 below, the clad glass composition selected was Glass A. The core glass composition selected was Glass B. For a 1 mm total laminate thickness and a clad to core thickness ratio of 1:9 with the glass combination of clad glass Glass A and core glass Glass B, a strengthened laminated glass sheet at room temperature is obtained having a compressive stress of 213 MPa.

Example 2

Laminate Strength Degradation or Weakening Procedure

In embodiments, the disclosure provides a method for making a laminate glass sheet having strength degradation including selecting a clad and a core glass composition so that the clad glass has a higher effective CTE in a portion of the glass transition region.

Selecting a clad and a core glass composition so that the clad glass has a greater effective CTE compared to the core glass in a portion of the glass transition region can lead to weakened or compromised strength of the glass product.

In one illustrative example listed in Table 1 below, the clad glass composition selected was Glass C. The core glass composition selected was Glass D. The selected glasses having a difference in thermal strains, respectively, are shown in FIGS. 3 and 4.

Figure 3:
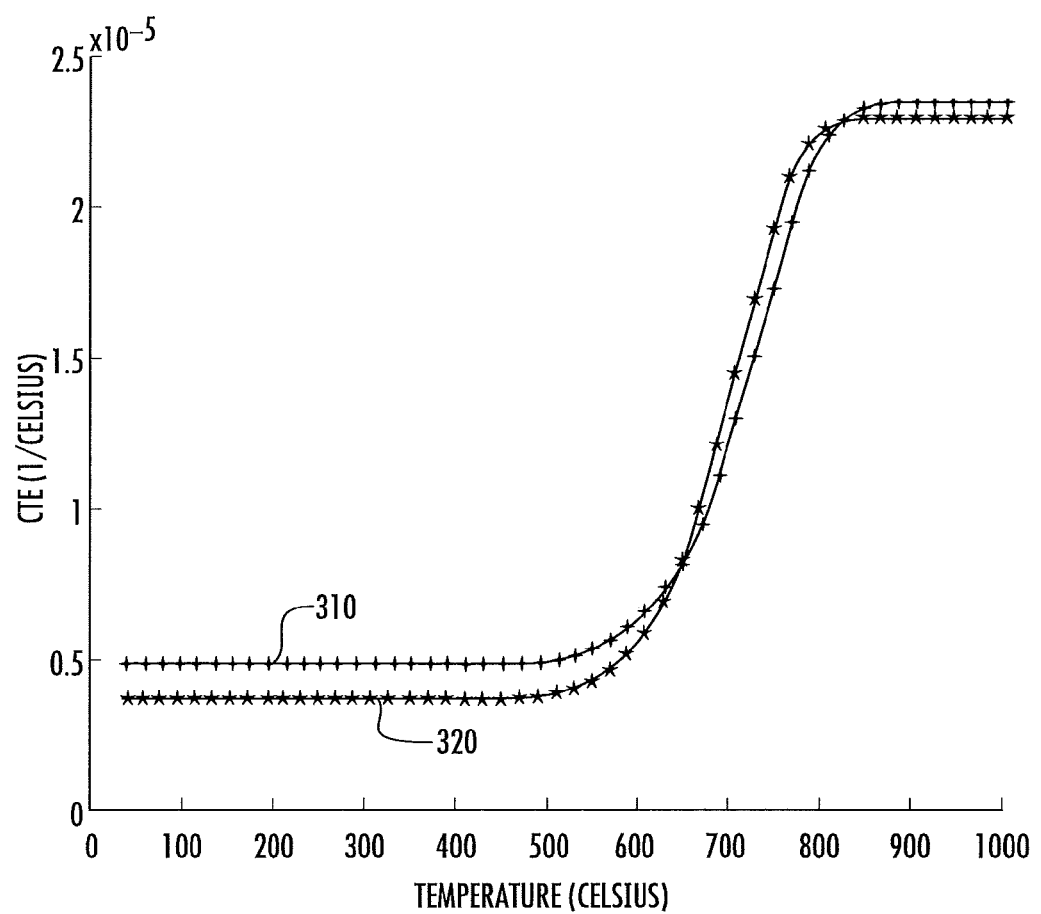
FIG. 3 shows the CTE v. temperature profile of a selected laminate core glass (310) and the laminate clad glass (320) combination.
Figure 4:
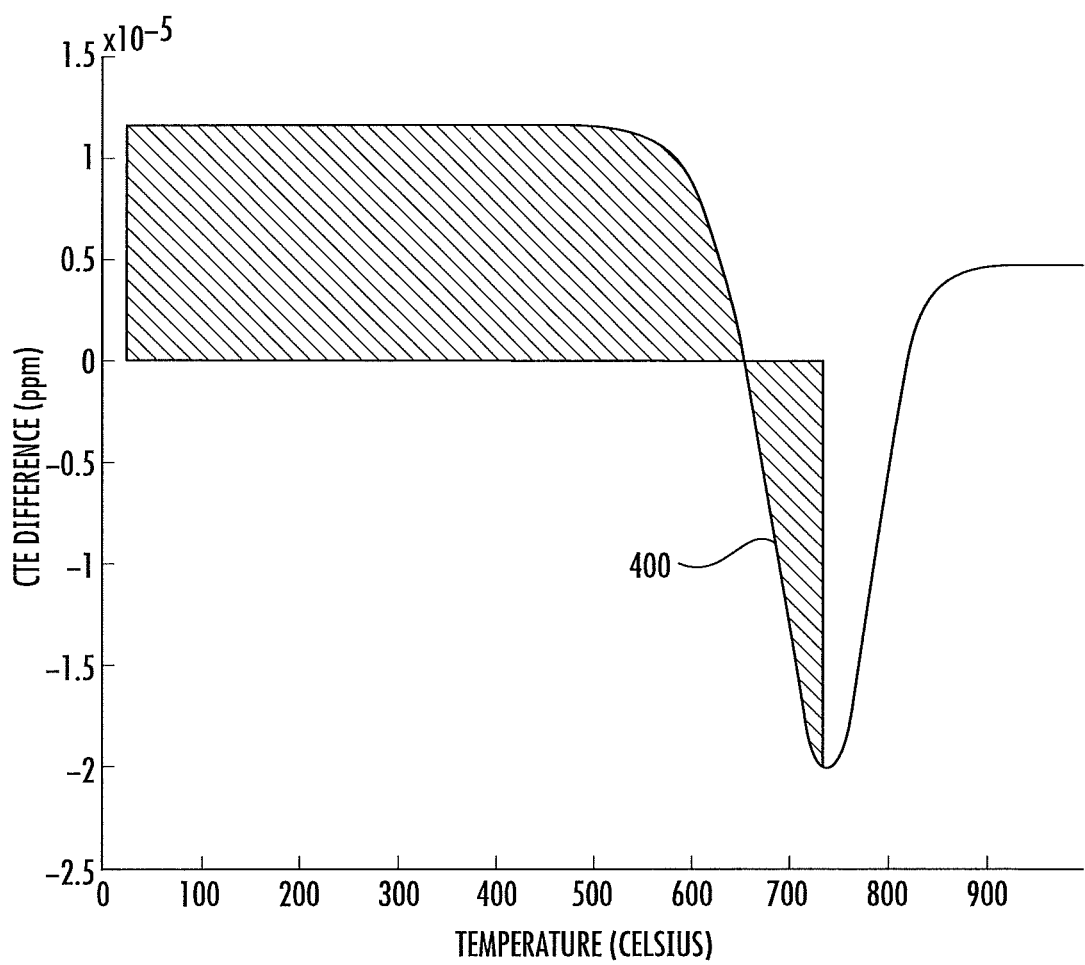
FIG. 4 shows the extent of the strength diminution (400) for the glass pair of FIG. 3.

FIG. 3 shows the CTE v. temperature profile of the selected laminate core glass (310) and the laminate clad glass (320). The final compressive stress of the clad glass in this example was 53 MPa. In this example, the strain difference between the core and the clad glass was small, such as $1.0804 \times 10^{-4}$ in the viscoelastic region, and leads to degradation of stress in the final laminate glass article. FIG. 4 shows the extent of the strength diminution (400) having a negative value for the area (A) metric in the temperature region of interest.

Example 3

Temperature Independent Laminate Strengthening Procedure

In embodiments, the disclosure provides a method for making a laminate glass sheet having temperature independent laminate strengthening including: selecting a core and a clad glass composition that have at least some thermal strain difference in the viscoelastic region and little to no thermal strain difference below the viscoelastic zone.

In one illustrative example listed in Table 1 below, the clad glass composition selected was Glass A and the core glass composition selected was Glass C.

For the glass A and C combination having a thermal strain difference between the two glasses of, for example, 0.22 ppm/° C., the resulting laminated sheet will possess strong temperature independent strengthening in the elastic region of the glasses.

Figure 5:
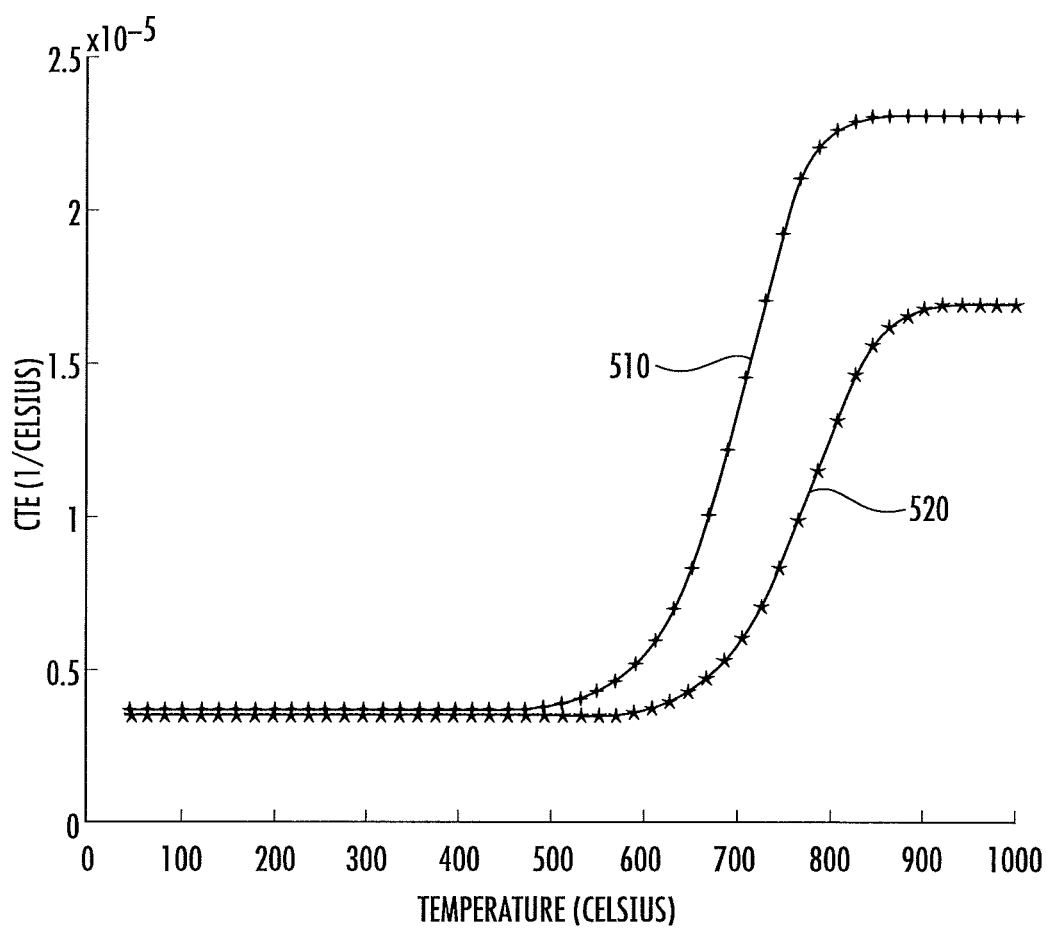
FIG. 5 shows the CTE v. temperature profile of a selected laminate core glass (510) and the laminate clad glass (520) combination.
Figure 6:
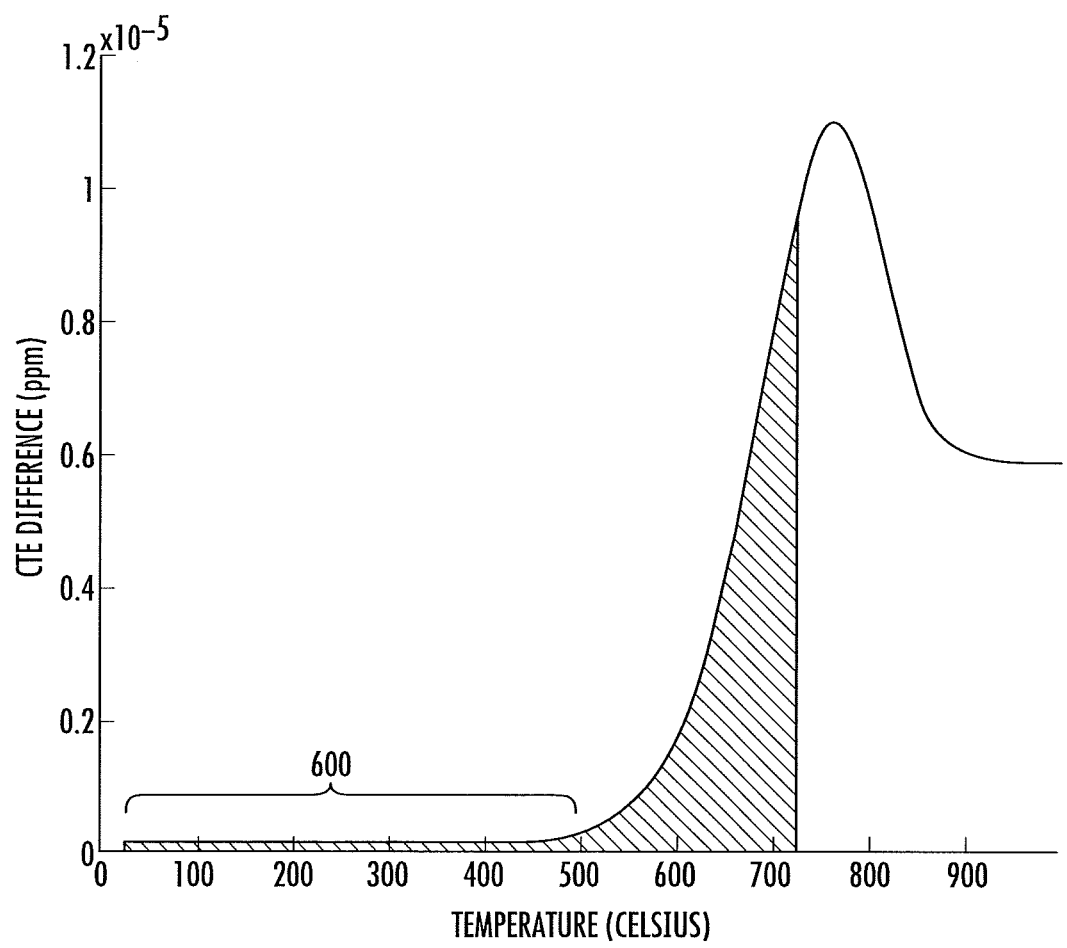
FIG. 6 shows the region of temperature independence (600) for the glass pair of FIG. 5.

FIGS. 5 and 6 show the difference in thermal strains and the area (A) metric, respectively. The final compressive strength of the laminate glass product for the two selected glasses A and C was 50 MPa in the clad glass with little temperature dependence up to 500° C. FIG. 5 shows the CTE v. temperature profile of the selected laminate core glass (510) and the laminate clad glass (520). The laminate strength changed by only about 8% when reheated from room temperature (e.g., 25° C. or 298.15° K) to 475° C. (773.15° K).

FIG. 6 shows the region of low temperature dependence (600) from about 25° C. (298 K) to about 475° C. (773.15 K), that is, there is a lower CTE difference between the selected core and clad glass compositions, or difference in the area (A) metric at lower temperatures. The laminate strength changed considerably when reheated beyond 475° C. (773.15 K) where the product lost about 66% of it's room temperature strength (50 MPa) when heated to 700° C. (973.15 K).

Accordingly: 1) laminate glass article strengthening can be achieved even with a low CTE difference in the room temperature CTE (e.g., 0.2 ppm/° C.); and 2) the achieved strengthening changes only by about 2% when the laminate glass article is heated to 500° C. (773.15 K). Specific conditions for this to occur include, for example, when the CTE difference between the clad glass and the core glass is only 0.2 ppm/° C. However, the glass transition temperature ($T_g$) is separated by 86° C. (86 K). This small CTE difference and large $T_g$ difference can lead to strengthening at higher temperatures in the glass transition.

$$\alpha_g^{core} - \alpha_g^{clad} = 0.2 \text{ ppm/}^\circ\text{C}.$$

$$\Delta T_g = 86^\circ \text{C}.$$

TABLE 1

Selection of Example $CTE_{eff}$ versus temperature curve combinations.

| Example and Figs. | Difference Condition(s) for: clad $CTE_{eff}$ and core $CTE_{eff}$ | Final Compressive Stress of the Clad layer in a three layer laminate (MPa)[3] | Temperature Dependent strengthening? |
|---|---|---|---|
| 1 FIGS. 1&2 | core $CTE_{eff}$ always greater than clad $CTE_{eff}$ | 213 | Yes |
| 2 FIGS. 3&4 | i) the clad $CTE_{eff}$ is initially less than the core $CTE_{eff}$; ii) in the crossover or transition region, the clad $CTE_{eff}$ is greater than the core $CTE_{eff}$; and iii) the clad $CTE_{eff}$ is less than to the core $CTE_{eff}$ | 53 | Yes |
| 3 FIGS. 5&6 | i) the clad $CTE_{eff}$ is comparable to the core $CTE_{eff}$ over a temperature range of 200 to 580° C.; and ii) the clad $CTE_{eff}$ is less than to the core $CTE_{eff}$ over the temperature range of 600 to 900° C. | 50 | No[1,2] |

[1]The final strength is independent of temperature in the elastic region of the laminate structure. The laminate does not lose strength significantly when the laminate, that has been cooled to ambient temperature, is reheated up to about 475° C.
[2]Strength loss is about 4 MPa when the laminate is heated to 475° C., i.e., reheating the laminate results in limited strength loss of about 8% compared to high strength losses of about 53% and about 79% on reheating as in Examples 1 and 2 respectively.
[3]The compressive stress of the clad layer can be calculated by TN modeling to compute the exact stress evolution and the final stress in the product.

TABLE 2

Exemplary glass compositions that were used in pairs in Examples 1, 2, and 3.

| | Analyzed Composition (mol %) | | | |
|---|---|---|---|---|
| | Glass A[1] | Glass B[2] | Glass C[3] | Glass D[4] |
| $SiO_2$ | 67.56 | 66.54 | 60.13 | 56.58 |
| $Al_2O_3$ | 11 | 10.03 | 11.66 | 16.74 |
| $B_2O_3$ | 9.83 | 6 | 17.75 | 10.27 |
| $Na_2O$ | — | 0.09 | 0.03 | — |
| $K_2O$ | — | 5.79 | — | 3.31 |
| MgO | 2.26 | 1.9 | 1.38 | 3.82 |
| CaO | 8.73 | 6.23 | 7.07 | 4.49 |
| SrO | 0.52 | 3.28 | 1.79 | 4.61 |
| BaO | — | 0.04 | 0.03 | — |
| $SnO_2$ | 0.07 | 0.07 | 0.15 | 0.18 |
| $ZrO_2$ | 0.02 | 0.02 | — | — |
| $Fe_2O_3$ | 0.01 | 0.01 | 0.01 | — |
| Total | 100 | 100 | 100 | 100 |

[1]Glass A see U.S. Pat. No. 7,851,394.
[2]Glass B see copending USSN 61/866,168 and USSN 61/878,829, p 33-34, glass #33.
[3]Glass C see copending USSN 61/604,839.
[4]Glass D see copending USSN 61/228,290 and USSN 61/263,930.

In embodiments, the disclosure provides a method for making and controlling the strength properties of a glass laminate sheet comprising:
  selecting a combination of a first core glass composition and a second clad glass composition for a glass laminate structure; and
  processing the selected first core glass composition and the second clad glass composition in the glass transition region, i.e., the visco-elastic region, in a laminate fusion draw apparatus at cooling rate of from 1 to 15° C. per second to form the laminate glass sheet having a selected strength property.

In embodiments, the cooling rate can be, for example, from 2 to 10° C. per second, from 3 to 8° C. per second, from 4 to 6° C. per second, including intermediate values and ranges. Specific cooling rates can be, for example, 1° C., 2° C., 3° C., 4° C., 5° C., 6° C., 7° C., 8° C., 9° C., 10° C., 11° C., 12° C., 13° C., 14° C., and 15° C. per second, including intermediate values and ranges. In embodiments, an actual cooling rate of 5° C. per second demonstrated a strength property of about 213 MPa.

In embodiments, the selected strength property can be, for example, a lower strength of from 206 to 210 MPa, for example, 208 MPa, for a lower cooling rate of 1 to 3° C. per second, for example, about 2° C. per second.

In embodiments, the selected strength property can be, for example, a higher strength of from 214 to 218 MPa, for example, 216 MPa, for a higher cooling rate of 8 to 12° C. per second, for example, about 10° C. per second.

In embodiments, the above method can further include, for example:
  determining and comparing the viscosity and coefficient of thermal expansion (CTE) profiles for each of the first core and the second clad glass compositions with each other over a temperature range of interest, including for example, the onset of viscoelasticity to ambient temperature, and which step can provide an approximate estimate of the strength properties of the resulting laminate.

Example 4

Cooling Rate Control of Product Strength

Examples 1 to 3 demonstrated the capability of altering the strength properties of the resulting laminate sheet product by changing the CTE, for example, pre-selecting the CTE, of the composition glasses in the glass transition zone.

Advantageously, for the same composition combination, the strength of the final product can also be changed by changing the cooling properties in the forming process. For example, a relatively slower cooling rate, such as 2° C./second, provides more time for the individual glass layers of the laminate to relax and relieve a portion of the stress in the glass transition region and results in a product with a lower strength. A relatively faster cooling rate, such as 10° C./second, does not permit the accumulated stress to relax in the glass transition region and results in a product with a higher strength.

Figure 9:
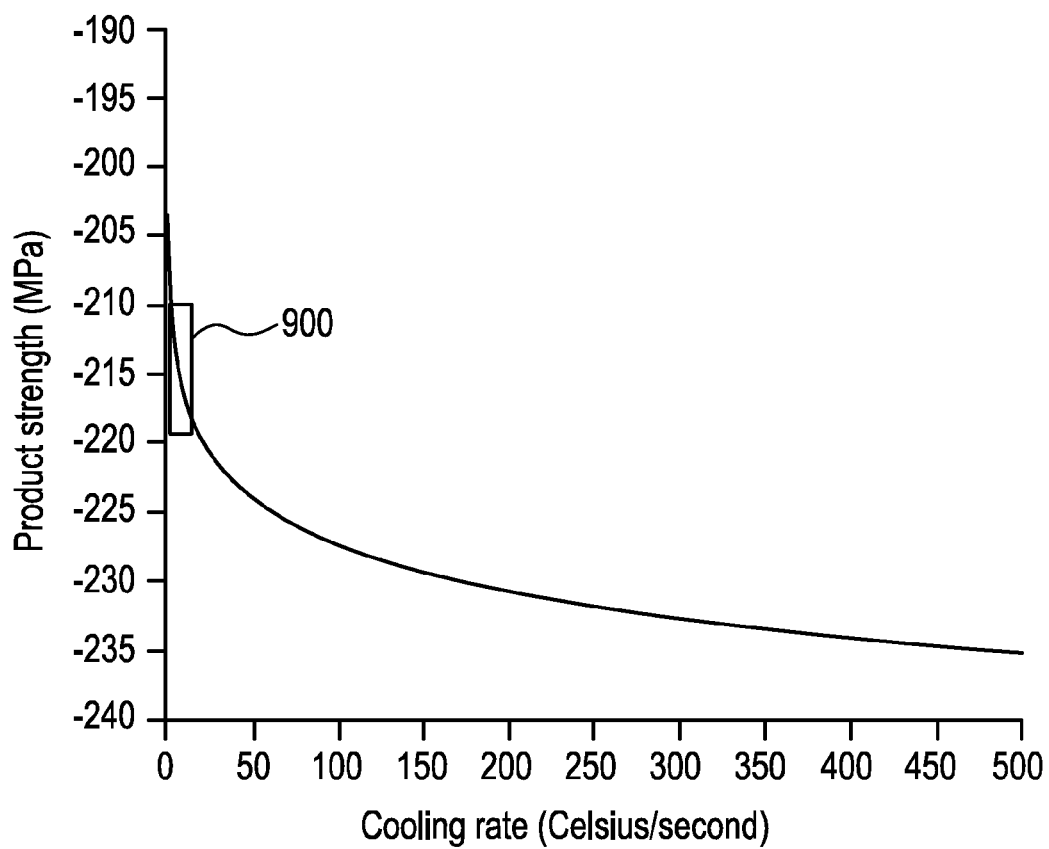
FIG. 9 shows a simulation of change in the compressive product stress of a laminate product at room temperature due to an increasing cooling rate over the range of 0 to 500° C. per sec.

FIG. 9 shows the simulated change in the compressive product stress of a laminate product at room temperature due to an increasing cooling rate over the range of 0 to 500° C. per sec. A selection of a portion of the curve of FIG. 9 (900) is shown in FIG. 10.

Figure 10:
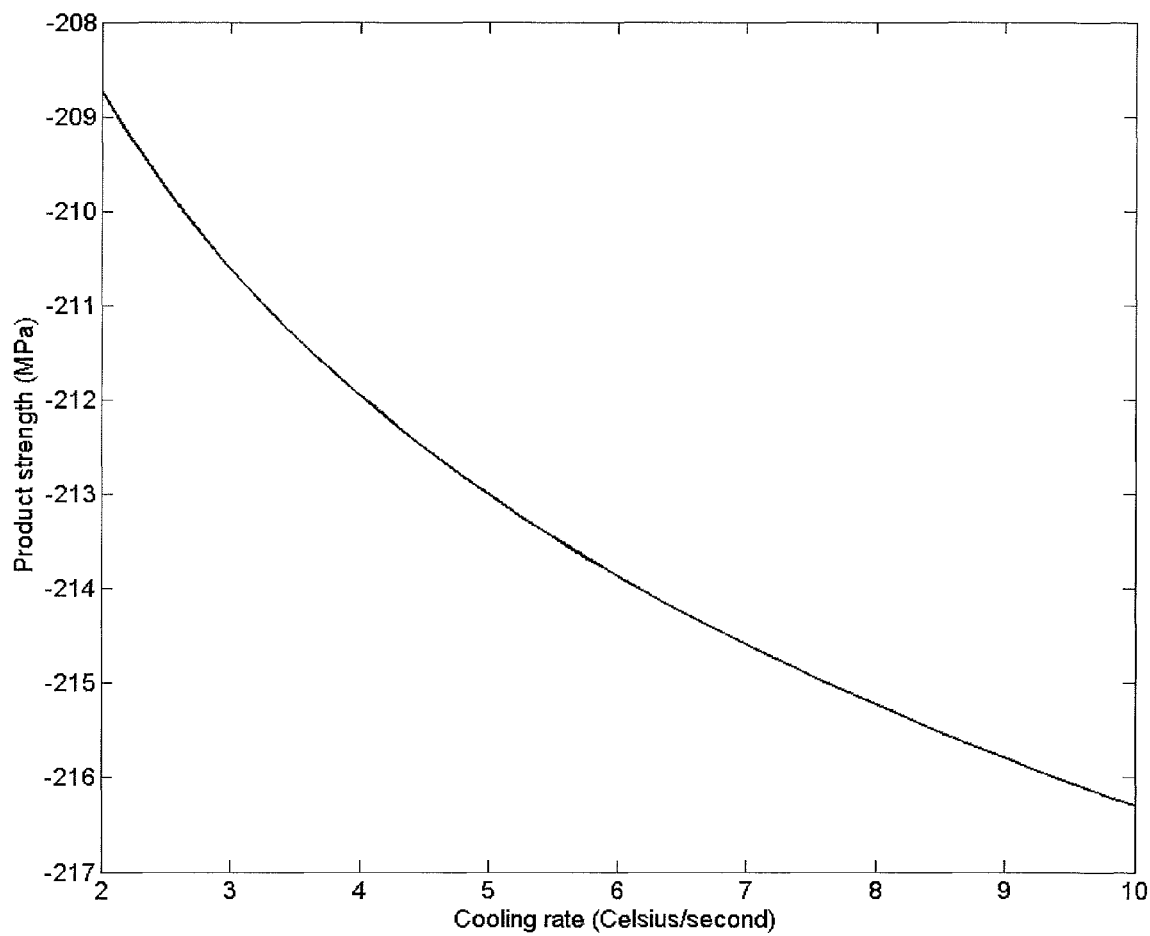
FIG. 10 shows the change in compressive stress of a product for a typical fusion draw machine (FDM) having a narrower cooling rate range, from 2° C./second to 10° C./second, for a portion (900) of the curve of FIG. 9.

FIG. 10 shows a portion (900) of the curve in FIG. 9 for the change in compressive stress of the product for a typical fusion draw machine (FDM) having a narrower cooling rate range, from 2° C./second to 10° C./second. The core and clad glass components selected here were Glass A and Glass B, respectively, as listed in Table 1. The strength of the product changes from a lower strength of about 208 MPa to a higher strength of about 216 MPa when the cooling rate is changed from about 2° C. per second to about 10° C. per second, respectively.

The disclosure has been described with reference to various specific embodiments and techniques. However, it should be understood that many variations and modifications are possible while remaining within the scope of the disclosure.

The invention claimed is:

1. A method for making a glass laminate sheet comprising:
   selecting a first core glass composition and a second clad glass composition combination for a glass laminate structure;
   determining and comparing the viscosity and coefficient of thermal expansion (CTE) profiles for each of the first core and the second clad glass compositions with each other over a temperature range of interest including the onset of viscoelasticity to ambient temperature; and
   processing the selected first core glass composition and the second clad glass composition in a laminate fusion draw apparatus to form a laminate glass sheet in accordance with at least one difference condition for the clad effective coefficient thermal expansion ($CTE_{\textit{eff clad}}$) and the core effective coefficient thermal expansion ($CTE_{\textit{eff core}}$).

2. The method of claim 1 wherein at least one difference condition for the clad $CTE_{\textit{eff}}$ and the core $CTE_{\textit{eff}}$ comprises at least one of: maximum strengthening, strength degradation, or temperature independent strengthening.

3. The method of claim 2 wherein maximum strengthening comprises having the core $CTE_{\textit{eff}}$ always greater than clad $CTE_{\textit{eff}}$.

4. The method of claim 2 wherein strength degradation comprises having:
   the clad $CTE_{\textit{eff}}$ initially less than the core $CTE_{\textit{eff}}$;
   in the crossover or transition region, the clad $CTE_{\textit{eff}}$ is greater than the core $CTE_{\textit{eff}}$; or
   below the glass transition region, the clad $CTE_{\textit{eff}}$ is less than to the core $CTE_{\textit{eff}}$.

5. The method of claim 2 wherein temperature independent strengthening comprises having the clad $CTE_{\textit{eff}}$ being comparable to the core $CTE_{\textit{eff}}$ over a temperature range of 200 to 580° C.

6. The method of claim 1 wherein determining comprises calculating an area (A) metric of the formula:

$$A = \int_{298}^{T_0} \frac{d\varepsilon^{thdiff}}{dT} dT = \int_{298}^{T_0} \alpha_{\textit{eff}}^{thdiff} dT$$

for the selected combination of the clad composition and the core glass composition to determine the difference condition, where
   $\varepsilon^{thdiff}$ is the thermal strain difference between the two glasses;
   $\alpha_{\textit{eff}}^{thdiff}$ is the difference in $CTE_{\textit{eff}}$ of the two glasses; and
   T is the temperature from the onset of viscoelasticity ($T_0$) to ambient.

7. The method of claim 1 further comprising determining the compressive stress of the clad layer in the resulting glass laminate sheet.

8. The method of claim 1 wherein the resulting glass laminate sheet comprises a two layer (clad:core) laminate structure, or a three layer (clad:core:clad) laminate structure.

9. The method of claim 1 further comprising:
   determining and comparing the viscosity and coefficient of thermal expansion (CTE) profiles for each of the first core and the second clad glass compositions with each other over an applicable temperature range including the onset of viscoelasticity to ambient temperature.

10. A method for making a glass laminate sheet comprising:
    selecting a combination of a first core glass composition and a second clad glass composition for a glass laminate structure; and
    processing the selected first core glass composition and the second clad glass composition in the glass transition region in a laminate fusion draw apparatus at cooling rate of from 1 to 15° C. per second to form the laminate glass sheet having a selected strength property.

11. The method of claim 10 wherein the cooling rate is from 2 to 10° C. per second.

12. The method of claim 10 wherein the cooling rate is from 3 to 8° C. per second.

13. The method of claim 10 wherein the cooling rate is from 4 to 6° C. per second.

14. The method of claim 10 wherein the selected strength property comprises a lower strength of from 206 to 210 MPa for a lower cooling rate of 1 to 3° C. per second.

15. The method of claim 10 wherein the selected strength property comprises a higher strength of from 214 to 218 MPa for a higher cooling rate of 8 to 12° C. per second.

* * * * *